(12) United States Patent
Sugizaki et al.

(10) Patent No.: US 12,535,456 B2
(45) Date of Patent: Jan. 27, 2026

(54) CHEMICAL SENSOR MODULE AND METHOD FOR IDENTIFYING SAMPLE SUBSTANCES

(71) Applicant: KABUSHIKI KAISHA TOSHIBA, Tokyo (JP)

(72) Inventors: Yoshiaki Sugizaki, Fujisawa Kanagawa (JP); Hiroko Miki, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1190 days.

(21) Appl. No.: 17/445,589

(22) Filed: Aug. 20, 2021

(65) Prior Publication Data

US 2022/0308012 A1   Sep. 29, 2022

(30) Foreign Application Priority Data

Mar. 23, 2021 (JP) ................. 2021-048070

(51) Int. Cl.
*G01N 27/414* (2006.01)
*G01N 1/40* (2006.01)
*G01N 33/00* (2006.01)

(52) U.S. Cl.
CPC ....... *G01N 27/4146* (2013.01); *G01N 1/4005* (2013.01); *G01N 27/4145* (2013.01); *G01N 33/0031* (2013.01)

(58) Field of Classification Search
CPC ................. G01N 27/4145; G01N 27/4146
See application file for complete search history.

(56) References Cited

U.S. PATENT DOCUMENTS

| 2012/0134880 A1* | 5/2012 | Kurkina | G01N 33/487 977/773 |
|---|---|---|---|
| 2019/0062818 A1 | 2/2019 | Miki et al. | |
| 2020/0080977 A1 | 3/2020 | Isobayashi et al. | |

FOREIGN PATENT DOCUMENTS

JP   2011-208985 A   10/2011

* cited by examiner

*Primary Examiner* — Natalia Levkovich
(74) *Attorney, Agent, or Firm* — Finnegan, Henderson, Farabow, Garrett & Dunner, LLP

(57) ABSTRACT

A chemical sensor module includes first to n-th (n is a natural number of 2 or greater) graphene sensors; and an exposure mechanism exposing the first to n-th graphene sensors to first to n-th aqueous solutions containing a sample substance and having different concentrations of phosphate ion, magnesium ion, or sulfate ion. The chemical sensor module identifies the sample substance from the difference in electrical characteristics of the first to n-th graphene sensors.

6 Claims, 22 Drawing Sheets

| CHARGE | CONJUGATED DOUBLE BOND | VALENCE | ION SPECIES | CONCENTRATION OF PHOSPHORIC ACID IN SOLUTION | | | | |
|---|---|---|---|---|---|---|---|---|
| | | | | 0mM | 0.01mM | 1mM | 10mM | 100mM |
| CATION | PRESENT | 2+ | ARGININE AMIDE | | | 11.80% | | 0.75% |
| | | 1+ | 2-PHENYLETHYLAMINE | 8.30% | | 2.90% | 1.80% | 0.50% |
| | ABSENT | 1+ | 2-AMINOETHANOL | | 0.60% | 0% | | |
| ANION | PRESENT | 1- | BENZOIC ACID | 2.00% | 0.30% | 0% | | |
| | | 1- | PERILLIC ACID | 1.20% | --- | --- | --- | --- |
| | ABSENT | 1- ~ 2- | PHOSPHORIC ACID | 1.30% | | | | |
| | | 2- ~ 3- | CITRIC ACID | 1.90% | 0% | 0% | | |

☐ DRAIN CURRENT CHANGE OF 1% OR MORE
☐ DRAIN CURRENT CHANGE OF LESS THAN 1%
☐ NO DRAIN CURRENT CHANGE

FIG. 18

2-PHENYLETHYLAMINE

ARGININE AMIDE

PERILLIC ACID

BENZOIC ACID

2-AMINOETHANOL

CHEMICAL SENSOR MODULE AND METHOD FOR IDENTIFYING SAMPLE SUBSTANCES

CROSS-REFERENCE TO RELATED APPLICATION

This application is based upon and claims the benefit of priority from Japanese Patent Application No. 2021-048070, filed on Mar. 23, 2021; the entire contents of which are incorporated herein by reference.

FIELD

Embodiments described herein relate generally to a chemical sensor module and a method for identifying sample substances.

BACKGROUND

Graphene exhibits a large change in electrical characteristics (high sensitivity) with respect to the bonding, adsorption, or proximity of atoms and molecules on the surface thereof. A sensor using graphene can be used when detecting a sample substance incorporated into an aqueous solution from the gas phase in the aqueous solution.

BRIEF DESCRIPTION OF THE DRAWINGS

FIG. 18 is a table summarizing experimental results;

DETAILED DESCRIPTION

Figure 1:
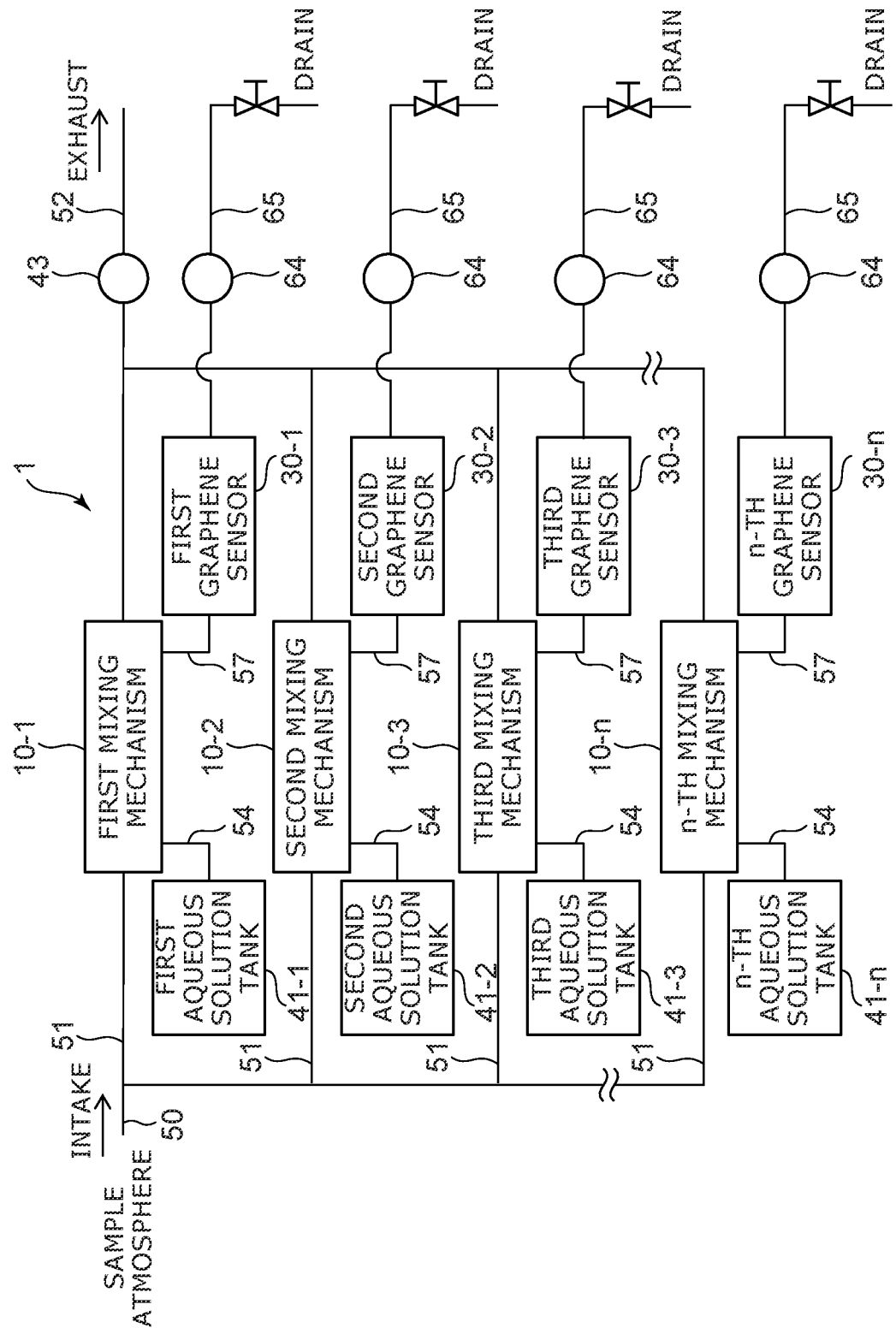
FIG. 1 is a schematic configuration diagram of a chemical sensor module of an embodiment.

According to one embodiment, a chemical sensor module includes first to n-th (n is a natural number of 2 or greater) graphene sensors; and an exposure mechanism exposing the first to n-th graphene sensors to first to n-th aqueous solutions containing a sample substance and having different concentrations of phosphate ion, magnesium ion, or sulfate ion. The chemical sensor module identifies the sample substance from the difference in electrical characteristics of the first to n-th graphene sensors.

Embodiments will now be described with reference to the drawings. The same components in the drawings are marked with the same reference numerals.

FIG. 1 is a schematic configuration diagram of a chemical sensor module 1 of an embodiment.

The chemical sensor module of the embodiment includes first to n-th (n is a natural number of 2 or greater) mixing mechanisms 10-1 to 10-$n$, first to n-th graphene sensors 30-1 to 30-$n$, and first to n-th aqueous solution tanks 41-1 to 41-$n$.

First to n-th pipes 51 are connected in parallel between an intake pipe 50 and an exhaust pipe 52. Any one of the first to n-th mixing mechanisms 10-1 to 10-$n$ is connected to each pipe 51. An intake and exhaust device 43 is connected to the exhaust pipe 52. The intake and exhaust device 43 is, for example, a pump or a fan. By driving the intake and exhaust device 43, a sample atmosphere is taken into the respective mixing mechanisms 10-1 to 10-$n$ via the intake pipe 50 and the respective pipes 51.

Any one of the first to n-th aqueous solution tanks 41-1 to 41-$n$ is connected to each of the mixing mechanisms 10-1 to 10-$n$ via a pipe 54. Aqueous solutions are stored in the aqueous solution tanks 41-1 to 41-$n$. The aqueous solutions in the aqueous solution tanks 41-1 to 41-$n$ have different concentrations of any one of phosphate ion, magnesium ion, and sulfate ion. The aqueous solution is, for example, any one of a HEPES (4-(2-hydroxyethyl)-1-piperazineethanesulfonic acid)) buffer, a phosphate buffer (a mixed solution of monosodium dihydrogen phosphate and disodium monohydrogen phosphate), and a mixture thereof. Alternatively, the aqueous solution is a HEPES buffer to which different concentrations of phosphoric acid have been added. Alternatively, the aqueous solution is a HEPES buffer to which different concentrations of magnesium sulfate have been added. The aqueous solution is supplied to the mixing mechanisms 10-1 to 10-$n$ from the aqueous solution tanks 41-1 to 41-$n$. The mixing mechanisms 10-1 to 10-$n$ expose the sample atmosphere to the aqueous solutions.

Each of the mixing mechanisms 10-1 to 10-$n$ is connected to any one of the first to n-th graphene sensors 30-1 to 30-$n$ via a pipe 57.

Each of the graphene sensors 30-1 to 30-$n$ is connected to a drainage pipe 65. A pump 64 is connected to each drainage pipe 65.

Figure 2:
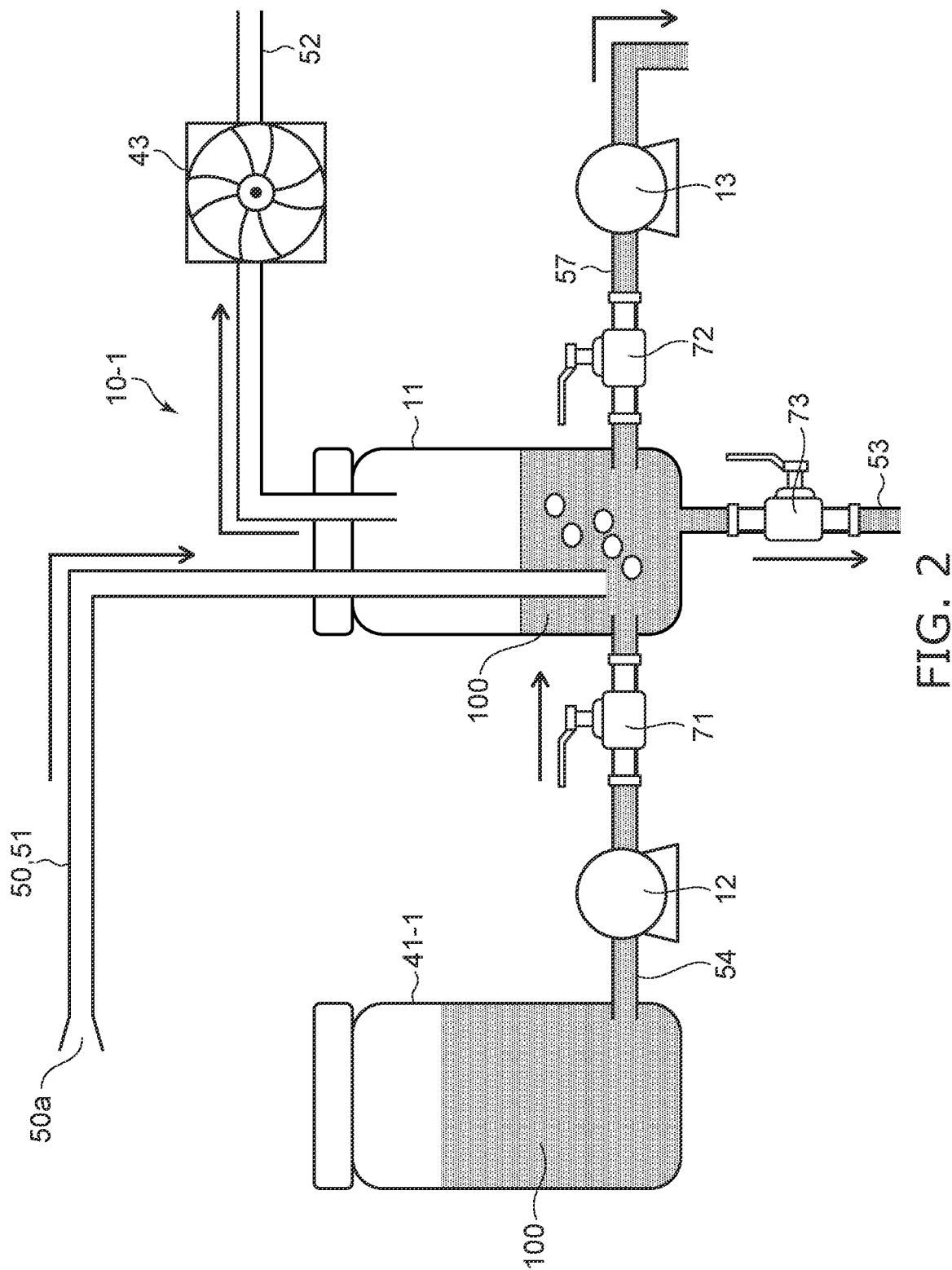
FIG. 2 is a schematic view showing an example of a mixing mechanism of the chemical sensor module of the embodiment.

FIG. 2 is a schematic view showing an example of a mixing mechanism. Although the first mixing mechanism 10-1 is represented in FIG. 2, the other mixing mechanisms 10-2 to 10-n are also configured in the same manner as the first mixing mechanism 10-1 including the connection relationship.

The first mixing mechanism (hereinafter, also simply referred to as a mixing mechanism) 10-1 includes a mixing tank for bubbling the sample atmosphere into an aqueous solution 100. The mixing tank 11 is connected to the first aqueous solution tank (hereinafter, also simply referred to as an aqueous solution tank) 41-1 via the pipe 54. A pump 12 and a valve 71 are connected to the pipe 54. By opening the valve 71 and driving the pump 12, the aqueous solution 100 stored in the aqueous solution tank 41-1 is supplied into the mixing tank 11.

At one end of the intake pipe 50, an atmosphere collection port 50a located outside the mixing tank 11 is formed. The other end of the pipe 51 connected to the intake pipe 50 is located in the aqueous solution 100 in the mixing tank 11. One end of the exhaust pipe 52 is located in the gas phase above the aqueous solution 100 in the mixing tank 11 and the other end of the exhaust pipe 52 is an exhaust port. The intake and exhaust device 43 is connected in the middle of the mixing tank 11 and the exhaust port in the exhaust pipe 52. By driving the intake and exhaust device 43, the sample atmosphere taken into the pipes 50 and 51 from the atmosphere collection port 50a is bubbled into the aqueous solution in the mixing tank 11 and the sample substances in the sample atmosphere are dissolved in the aqueous solution.

The mixing tank 11 is connected to the first graphene sensor (hereinafter, also simply referred to as a graphene sensor) 30-1 via the pipe 57. A valve 72 and a pump 13 are connected to the pipe 57. By opening the valve 72 and driving the pump 13, the aqueous solution 100 in the mixing tank 11 is supplied to the graphene sensor 30-1.

Figure 3:
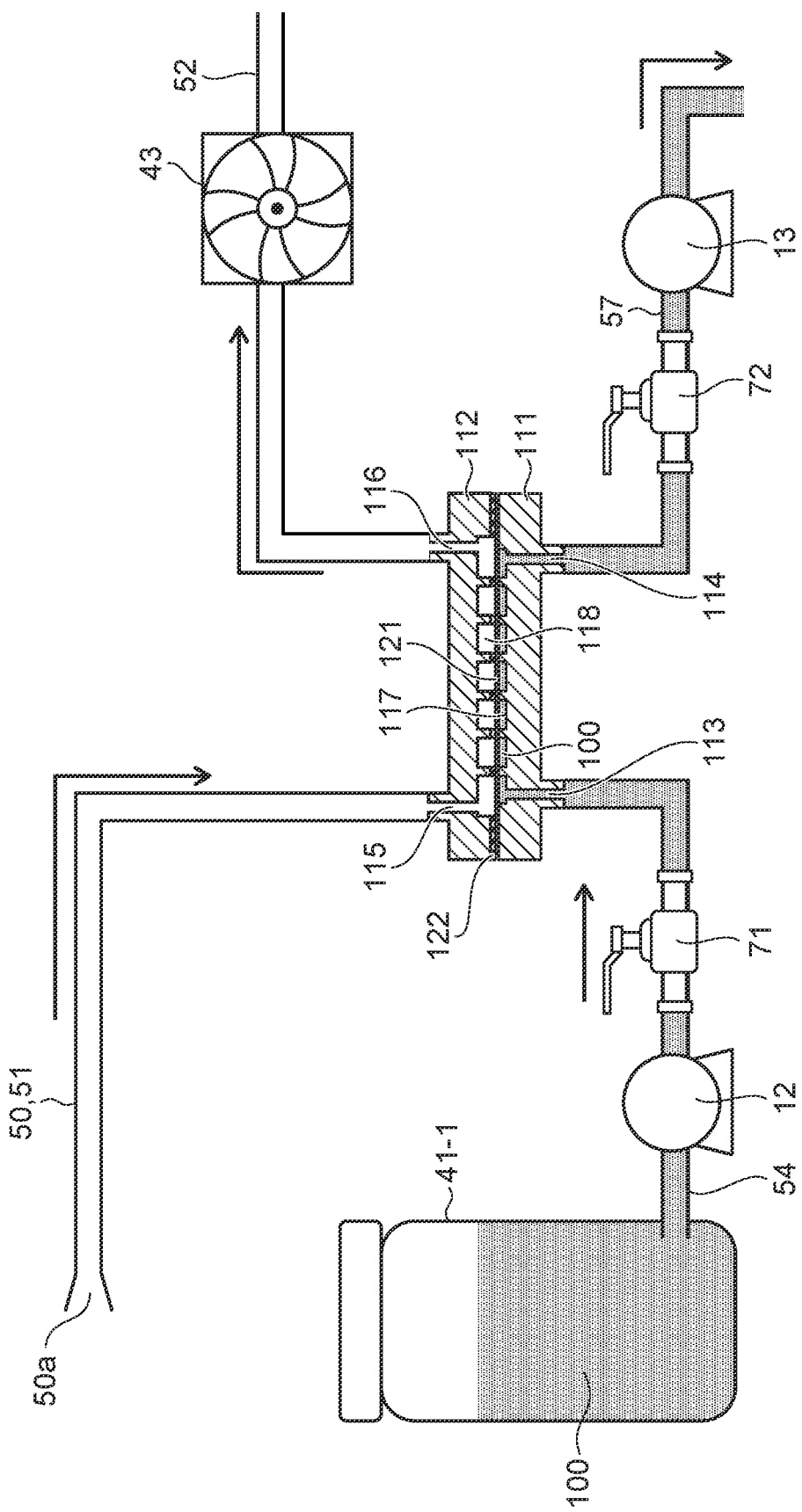
FIG. 3 is a schematic view of another example of the mixing mechanism of the chemical sensor module of the embodiment.

FIG. 3 is a schematic view of another example of the mixing mechanism.

Figure 4:
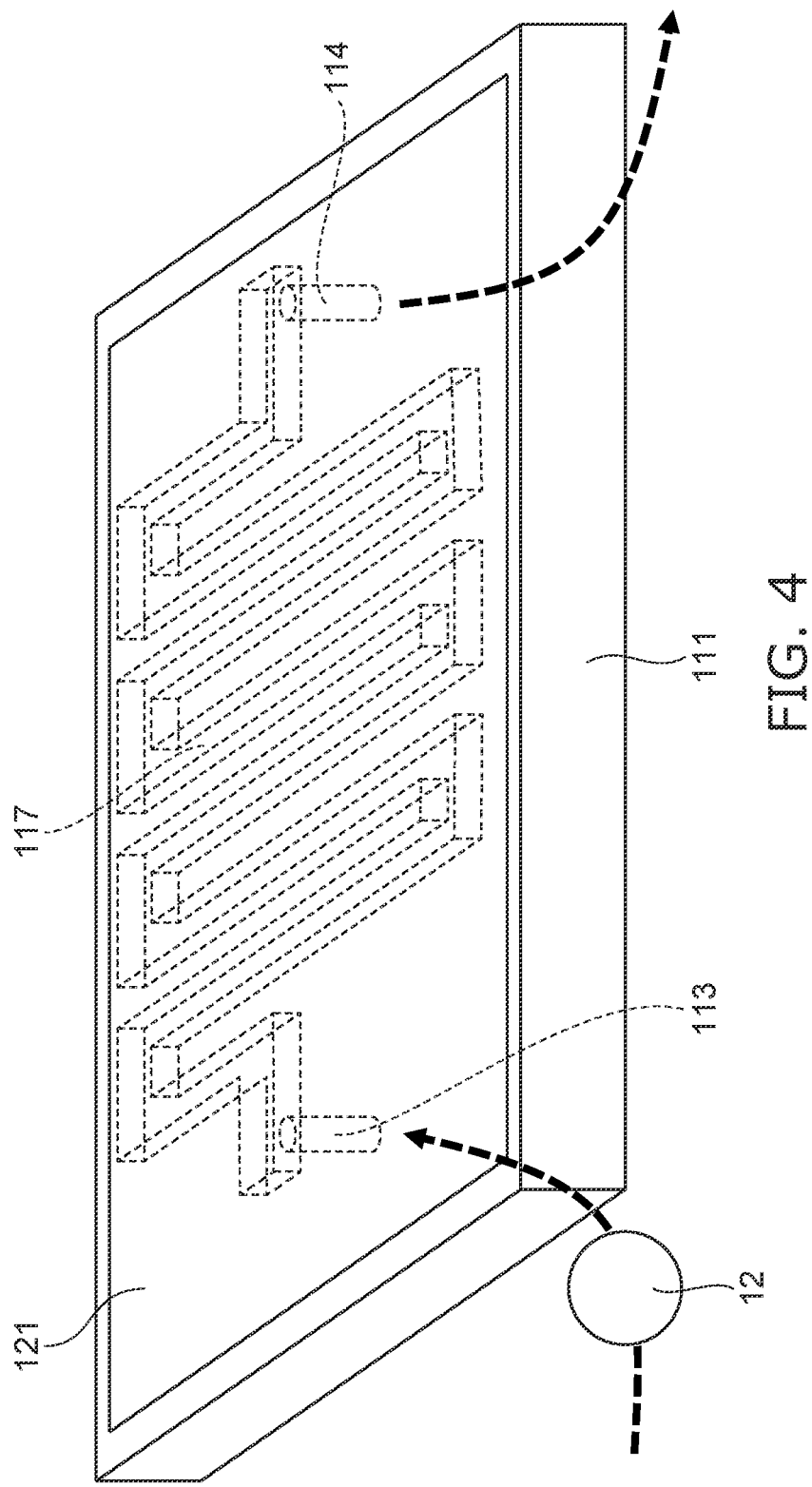
FIG. 4 is a schematic perspective view of a flow path chip of the mixing mechanism shown in FIG. 3.

FIG. 4 is a schematic perspective view of a flow path chip 111 shown in FIG. 3.

This mixing mechanism includes the flow path chip 111, a lid 112 superposed on the flow path chip 111, and a porous membrane 121 disposed between the flow path chip 111 and the lid 112.

Further, as shown in FIG. 4, the flow path chip 111 is formed with a liquid inflow path 113 connected to one end of a groove 117 and a liquid outflow path 114 connected to the other end of the groove 117. As shown in FIG. 3, the liquid inflow path 113 is connected to the pipe 54 to which the aqueous solution 100 is supplied, and the liquid outflow path 114 is connected to the pipe 57 connected to the graphene sensor 30-1.

If necessary, unevenness can be formed on the bottom surface of the groove 117. As the shape of the unevenness, for example, an asymmetric V-shaped groove called a chaotic mixer can be formed. By forming such unevenness, agitation occurs in the microchannel which tends to generate a laminar flow, and the efficiency of taking in target molecules via the porous membrane 121 described later is improved.

The porous membrane 121 covers the groove 117. The lid 112 is disposed on the porous membrane 121. The lid 112 is in close contact with the porous membrane 121 via a sealing member (for example, a rubber member) 122. A groove 118 is formed on the surface of the lid 112 facing the porous membrane 121 in the same pattern as the groove 117.

The lid 112 is formed with an intake passage 115 connected to one end of the groove 118 and an exhaust passage 116 connected to the other end of the groove 118. The intake passage 115 is connected to the pipe 51 for taking in the sample atmosphere, and the exhaust passage 116 is connected to the exhaust pipe 52.

By opening the valve 71 and the valve 72, respectively, and driving the pump 12 and the pump 13, the aqueous solution 100 stored in the aqueous solution tank 41-1 is supplied from the liquid inflow path 113 to the groove 117. The aqueous solution 100 does not permeate the porous membrane 121. Therefore, the aqueous solution 100 does not flow into the groove 118 above the porous membrane 121. In addition, only one of the pump 12 and the pump 13 may be used.

By driving the intake and exhaust device 43 connected to the exhaust pipe 52, the sample atmosphere taken into the pipes 50 and 51 from the atmosphere collection port 50a flows into the groove 118 from the intake passage 115. The sample substances in the sample atmosphere permeate the porous membrane 121, enter the groove 117 to which the aqueous solution is supplied, and are dissolved in the aqueous solution flowing in the groove 117.

The aqueous solution in the groove 117 exposed to the sample atmosphere flows through the liquid outflow path 114 as it is and is supplied to the graphene sensor 30-1.

Figure 5:
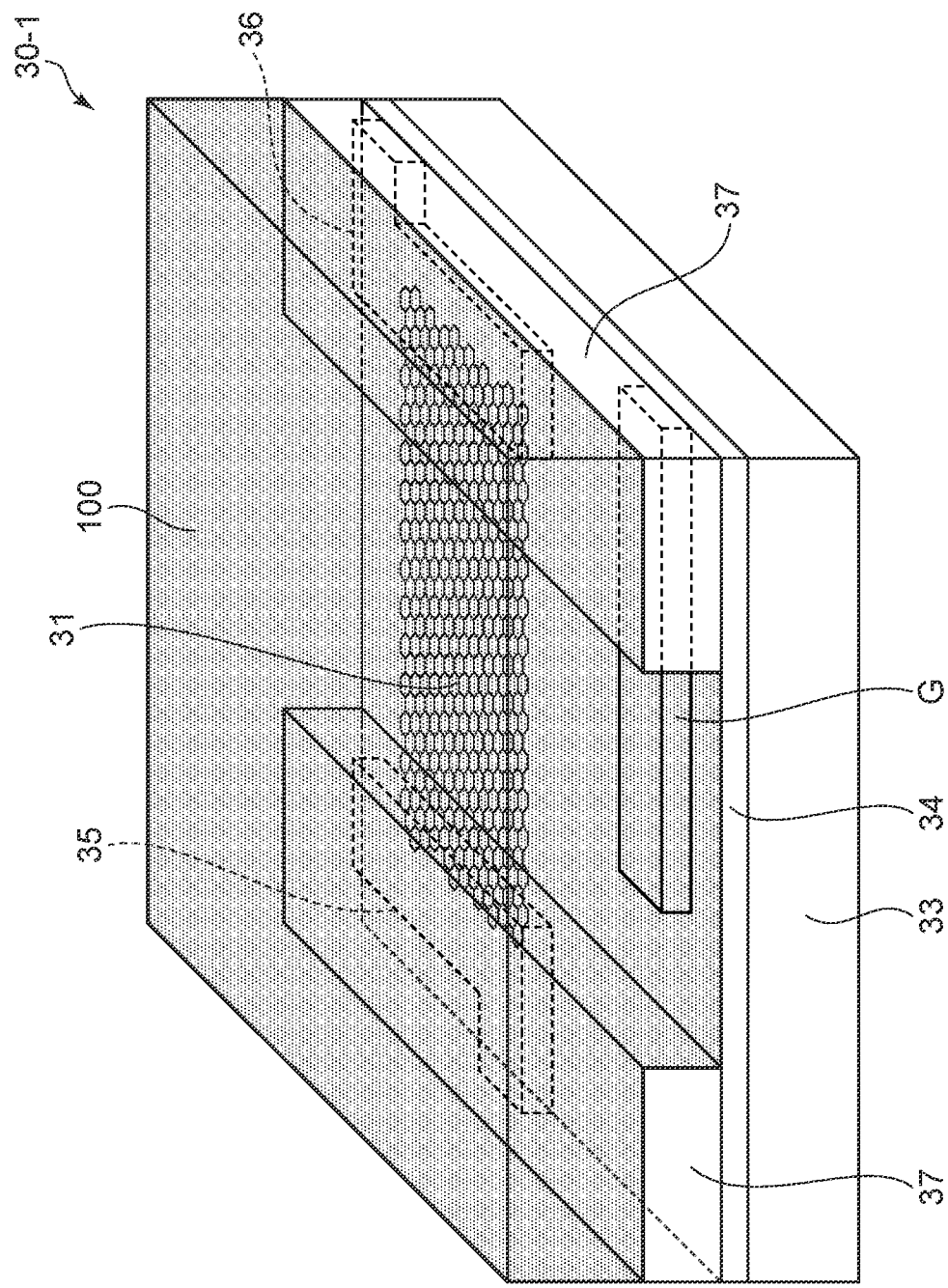
FIG. 5 is a schematic perspective view of a graphene sensor of the chemical sensor module of the embodiment.

FIG. 5 is a schematic perspective view of the graphene sensor. Although the first graphene sensor 30-1 is represented in FIG. 5, the other graphene sensors 30-2 to 30-n are configured in the same manner as the first graphene sensor 30-1.

The graphene sensor 30-1 is a charge detection element including a graphene film 31. The surface of the graphene film 31 is exposed to the aqueous solution 100 supplied from the mixing mechanism 10-1.

The graphene sensor 30-1 has, for example, a FET (field effect transistor) structure. The graphene sensor 30-1 includes a substrate 33 and a base film 34 provided on the substrate 33. The graphene film 31 is provided on the base film 34. Alternatively, the graphene film 31 may be provided on the surface of the substrate 33 without providing the base film 34. Further, a circuit or a transistor (not shown) may be formed on the substrate 33.

As a material of the substrate 33, for example, silicon, silicon oxide, glass, or a polymer material can be used. The base film 34 is an insulating film such as a silicon oxide film. Further, the base film 34 can also have a function of a chemical catalyst for forming the graphene film 31.

The graphene sensor 30-1 includes at least two electrodes (a first electrode 35 and a second electrode 36). One of the first electrode 35 and the second electrode 36 functions as a drain electrode, and the other functions as a source electrode.

The first electrode 35 and the second electrode 36 are covered with a protective insulating film 37. The protective insulating film 37 is, for example, aluminum oxide, silicon oxide, a polymer, or the like.

A gate wiring G is further formed on the base film 34 and a part of the gate wiring G is exposed without being covered with the protective insulating film 37. The portion of the gate wiring G exposed from the protective insulating film 37 is made of gold, platinum, silver, silver/silver chloride laminated film, or the like.

When the electronic state of the graphene film 31 is electrically detected, a desired gate potential can be applied to the aqueous solution 100 via the gate wiring G, which enables the electrical characteristics of the graphene film 31 to be adjusted to a state of high sensitivity.

Alternatively, by measuring the current between the source and drain of the graphene film 31 while scanning the gate potential, it is possible to measure the charge neutral point at which the carriers flowing in the graphene switch between holes and electrons and it is possible to know the state of charge injection into graphene film 31.

If necessary, the surface of the graphene film 31 may be coated with an insulator. As the insulator, for example, a peptide β sheet, a phospholipid membrane, or the like can be used.

The graphene film 31 is provided between the first electrode 35 and the second electrode 36. The first electrode 35 and the second electrode 36 are in electrical contact with the graphene film 31. The surface of the graphene film 31 (sensor element surface) is exposed in the flow path to which the aqueous solution 100 is supplied. A current can flow between the first electrode 35 and the second electrode 36 through the graphene film 31.

Figures 6A, 6B:
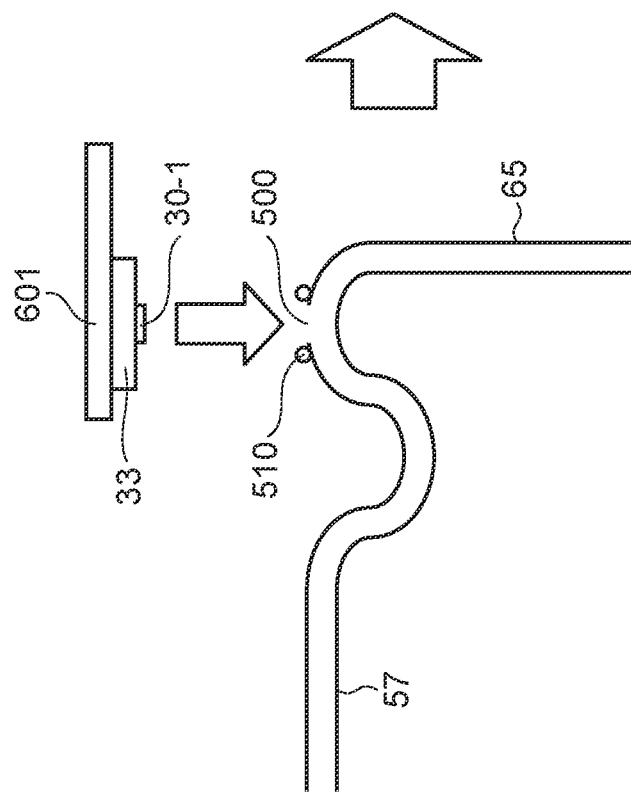
FIGS. 6A and 6B are schematic views of an exposure mechanism for exposing the graphene sensor to an aqueous solution.

FIGS. 6A and 6B are schematic views of an exposure mechanism for exposing the graphene sensor 30-1 to an aqueous solution.

As shown in FIG. 6A, a window 500 is opened in a sensor mounting portion of the pipe 57 and the pipe 65, and a packing 510 is formed on the outer periphery of the window 500. The graphene sensor 30-1 is mounted on a cartridge board 601.

As shown in FIG. 6B, when the sensor element surface of the graphene sensor 30-1 is installed facing the window 500 portion, the graphene sensor 30-1 is made airtight by the packing 510, and thus, the sensor element surface is exposed in the pipes 57 and 65. With such a form, the graphene sensor 30-1 can be attached to and detached from the sensor mounting portions of the pipes 57 and 65 as a replacement part and a consumable part.

Since the gate wiring G described above only needs to be in contact with the aqueous solution 100 in the vicinity of the graphene sensor 30-1, the gate wiring G does not necessarily have to be formed on the graphene sensor 30-1. For example, the gate wiring G may be formed on an element different from the graphene sensor 30-1 and exposed into the pipe through the window 500 of the pipe as in the graphene sensor 30-1 to be brought into contact with the aqueous solution 100 or may be formed directly inside the pipe.

Next, a method for identifying a sample substance using the chemical sensor module 1 of the embodiment will be described.

The sample atmosphere is supplied in equal amounts to the first to n-th mixing mechanisms 10-1 to 10-n via the respective pipes 51 branched from the intake pipe 50. Further, the first to n-th aqueous solutions are supplied from the first to n-th aqueous solution tanks 41-1 to 41-n to the first to n-th mixing mechanisms 10-1 to 10-n. The first to n-th aqueous solutions have different concentrations of phosphate ion, magnesium ion, or sulfate ion. That is, in the first to n-th mixing mechanisms 10-1 to 10-n, the same sample substance contained in the sample atmosphere is mixed in equal amounts with the first to n-th aqueous solutions having different concentrations of phosphate ion, magnesium ion, or sulfate ion.

Then, the first to n-th graphene sensors 30-1 to 30-n are exposed to the first to n-th aqueous solutions. The first to n-th aqueous solutions have different concentrations of phosphate ion, magnesium ion, or sulfate ion. The sample substance can be identified from the difference in the electrical characteristics of the first to n-th graphene sensors 30-1 to 30-n due to the difference in the ion concentration.

The sample substance is, for example, an ion. According to the first to n-th graphene sensors 30-1 to 30-n, for example, at least one of the charge of the sample substance, the valence, and the presence or absence of a conjugated double bond can be identified, depending on the difference in the concentration of phosphate ion, magnesium ion, or sulfate ion in the first to n-th aqueous solutions.

Phosphate ions, magnesium ions, and sulfate ions are polyvalent ions that have a high affinity for graphene and are adsorbed, bonded, or close to the surface of graphene in an aqueous solution to change the electrical characteristics of graphene (for example, drain current). Then, it is considered that the adsorption, binding, or proximity of these phosphate ions, magnesium ions, or sulfate ions to graphene competes with the adsorption, binding, or proximity of the sample substance to graphene, thereby masking the sample substance.

The results of experiments conducted by the inventors of the application will be described below.

The horizontal axis in each of the graphs of FIGS. 7 to 12 described below represents time, the horizontal axis in each of the graphs of FIGS. 13 to 17 and 19 represents the concentration, and the vertical axis in the graphs of FIGS. 7 to 17 and 19 represents the drain current change rate (the ratio of the drain current value after the change with time to the initial drain current value).

Figure 7:
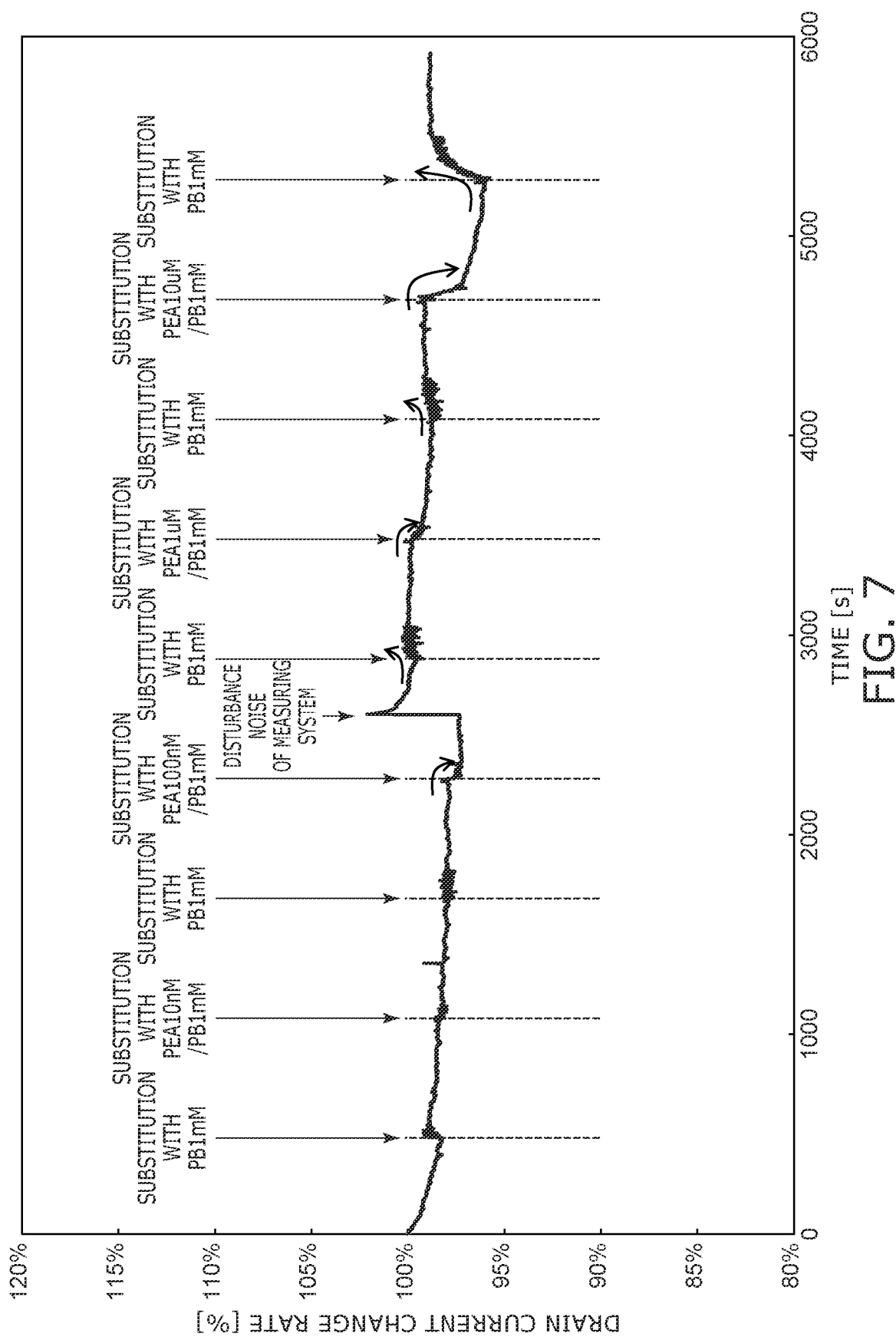
FIG. 7 is a graph showing a response of 2-phenylethylamine in a phosphate buffer.

FIG. 7 is a graph showing the response of 2-phenylethylamine (hereinafter, sometimes simply referred to as PEA) in a 1 mM phosphate buffer.

From the result of FIG. 7, a clear drain current response can be seen depending on the concentration of PEA. There are two possible reasons for this. One is the fluctuation of the pH of the phosphate buffer due to the addition of PEA, which is a cation. The other is the detection of adsorption, binding, or proximity of PEA molecules to the graphene surface. To verify this, the response of NaOH in a phosphate buffer was checked.

Figure 8:
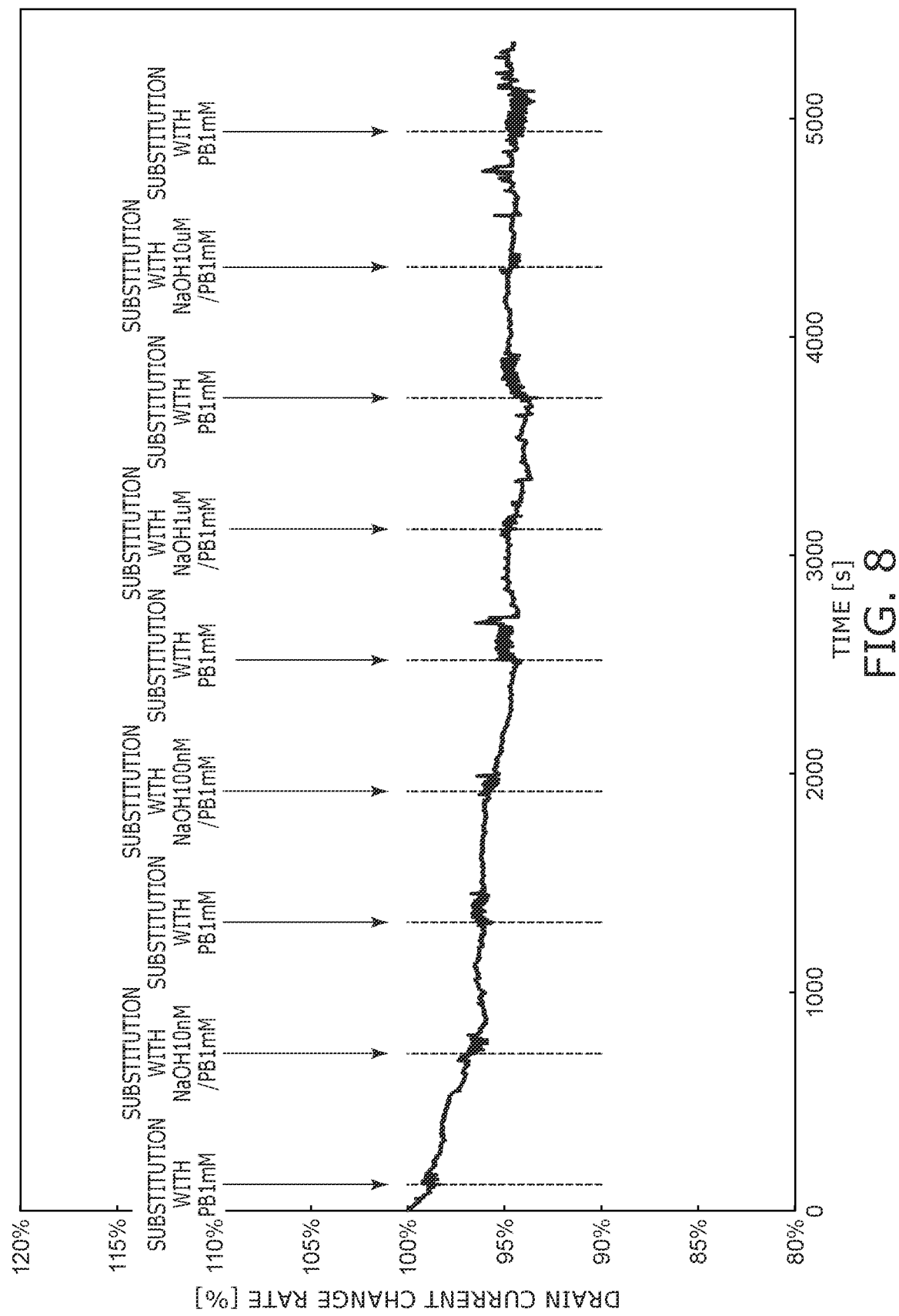
FIG. 8 is a graph showing a response of NaOH in the phosphate buffer.

FIG. 8 is a graph showing the response of NaOH in a 1 mM phosphate buffer.

Na ions act as cations in the phosphate buffer to adjust the pH. Assuming that the cause of the PEA response shown in FIG. 7 is the fluctuation of pH due to the PEA, which is a cation, the addition of NaOH to a 1 mM phosphate buffer should give the same response as in FIG. 7. However, according to the results of FIG. 8, there is no response to the addition of NaOH at all, which indicates that the response of PEA shown in FIG. 7 is not due to the fluctuation of pH but due to the detection of the PEA molecule by the graphene sensor.

Figure 9:
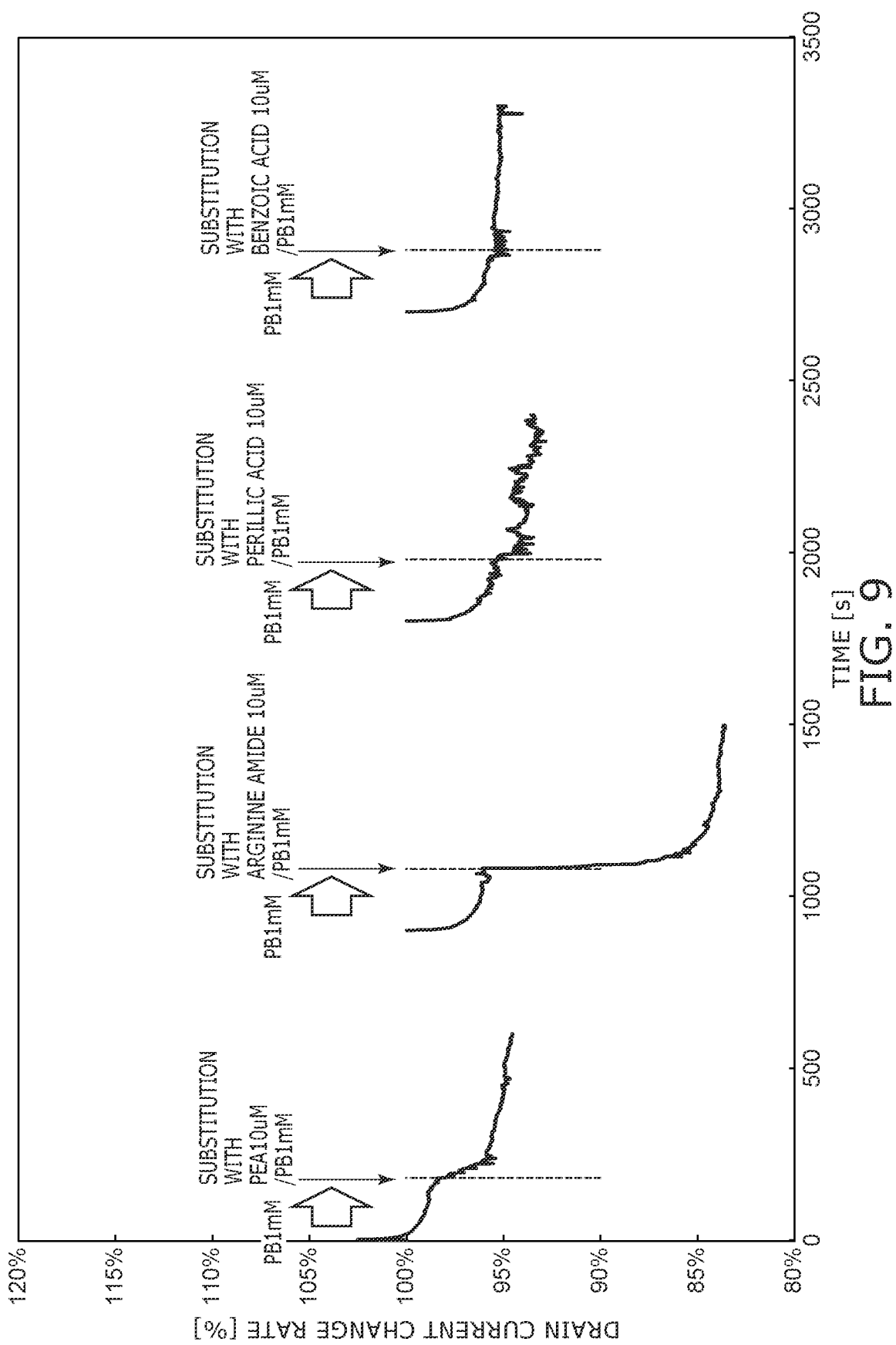
FIG. 9 is a graph showing responses of various ions in the phosphate buffer.

FIG. 9 is a graph showing the responses of various ions in the phosphate buffer. To a 1 mM phosphate buffer were added 10 μM 2-phenylethylamine, 10 μM arginine amide, 10 μM perillic acid, and 10 μM benzoic acid, respectively.

Here, 2-phenylethylamine, arginine amide, perillic acid, and benzoic acid each have the molecular structures shown in FIGS. 22A to 22D when dissociated as ions in an aqueous solution near neutrality. In FIGS. 22A to 22D, the portion indicated by the broken line is the range in which the π electrons of the double bond are delocalized. All of the above four ions have delocalized conjugated double bonds.

From the result of FIG. 9, the detection sensitivity differs depending on the ion species. 2-phenylethylamine and arginine amide, which are cations, are detected, but perillic acid and benzoic acid, which are anions, are not detected. It is considered that a cation-π interaction acts between a cation and graphene, and a cation is easier to be adsorbed to, bind to, or approach graphene than an anion.

Figure 10:
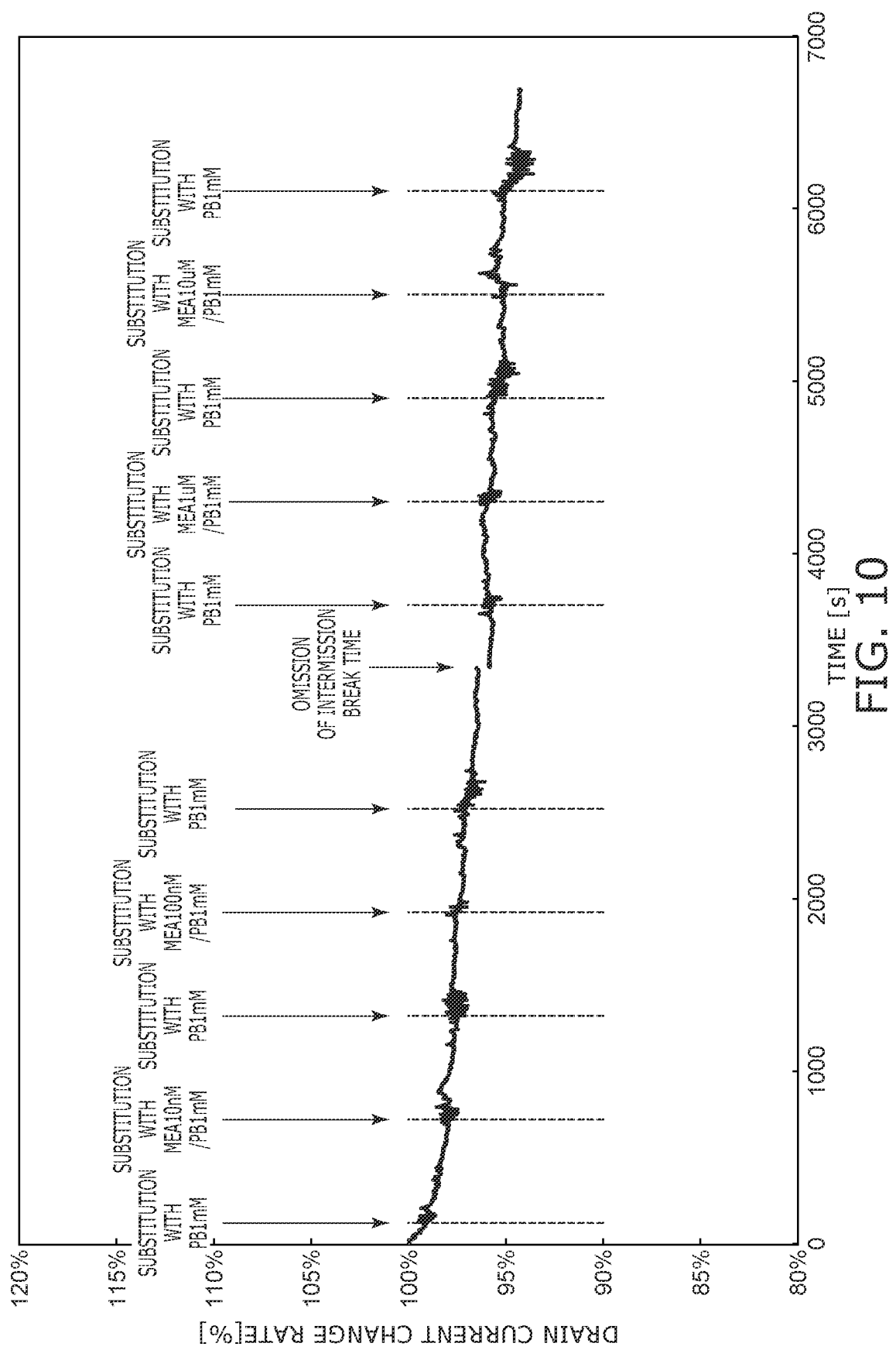
FIG. 10 is a graph showing a response of 2-aminoethanol in the phosphate buffer.

FIG. 10 is a graph showing the response of 2-aminoethanol (also known as monoethanolamine, hereinafter sometimes simply referred to as MEA) in a 1 mM phosphate buffer.

Figure 22A:
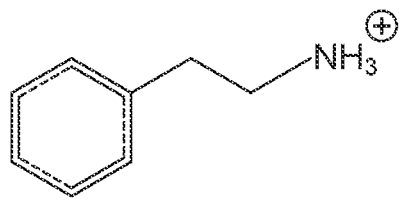
FIG. 22A is a structural formula of 2-phenylethylamine.
Figure 22B:
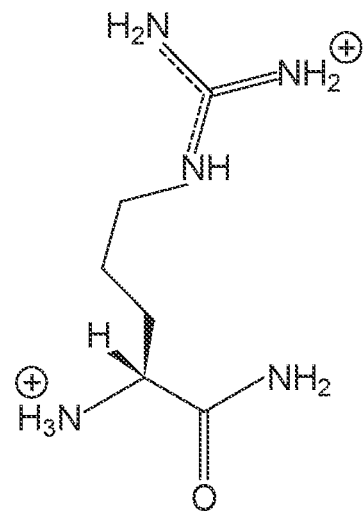
FIG. 22B is a structural formula of arginine amide.
Figure 22C:
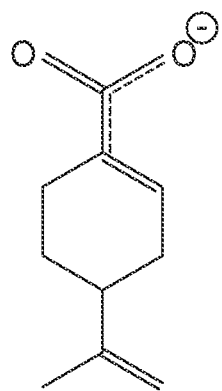
FIG. 22C is a structural formula of perillic acid.
Figure 22D:
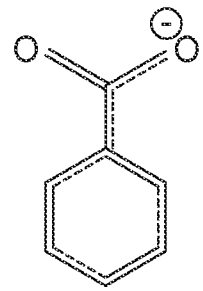
FIG. 22D is a structural formula of benzoic acid.
Figure 22E:
FIG. 22E is a structural formula oft-aminoethanol.

2-Aminoethanol is a cation. From the results shown in FIG. 10, some cations are not detected. The molecular structure of 2-aminoethanol in an aqueous solution near neutrality is as shown in FIG. 22E, and delocalization of π electrons does not occur. Since both 2-phenylethylamine and arginine amide detected in the experiment of FIG. 9 have a conjugated double bond, a Π-Π interaction occurs with graphene in addition to a cation-Π interaction, and the adsorption, bonding, or proximity to the graphene is easy. Since 2-aminoethanol, which was not detected in the experiment of FIG. 10, does not have a conjugated double bond, its ability to be adsorbed to, bind to, or approach graphene is only cation-H interaction, which is weaker than that of 2-phenylethylamine and arginine amide.

Perillic acid and benzoic acid, which were not detected in the experiment of FIG. 9, have a conjugated double bond but are not cations. Therefore, it is considered to be difficult to be adsorbed, bonded, or close to graphene as much as there is no cation-Π interaction.

It was considered that the phosphate ion and other ions might be competing with each other in adsorption, binding, or proximity to graphene in the aqueous solution, and the response to the phosphate ion was checked.

Figure 11:
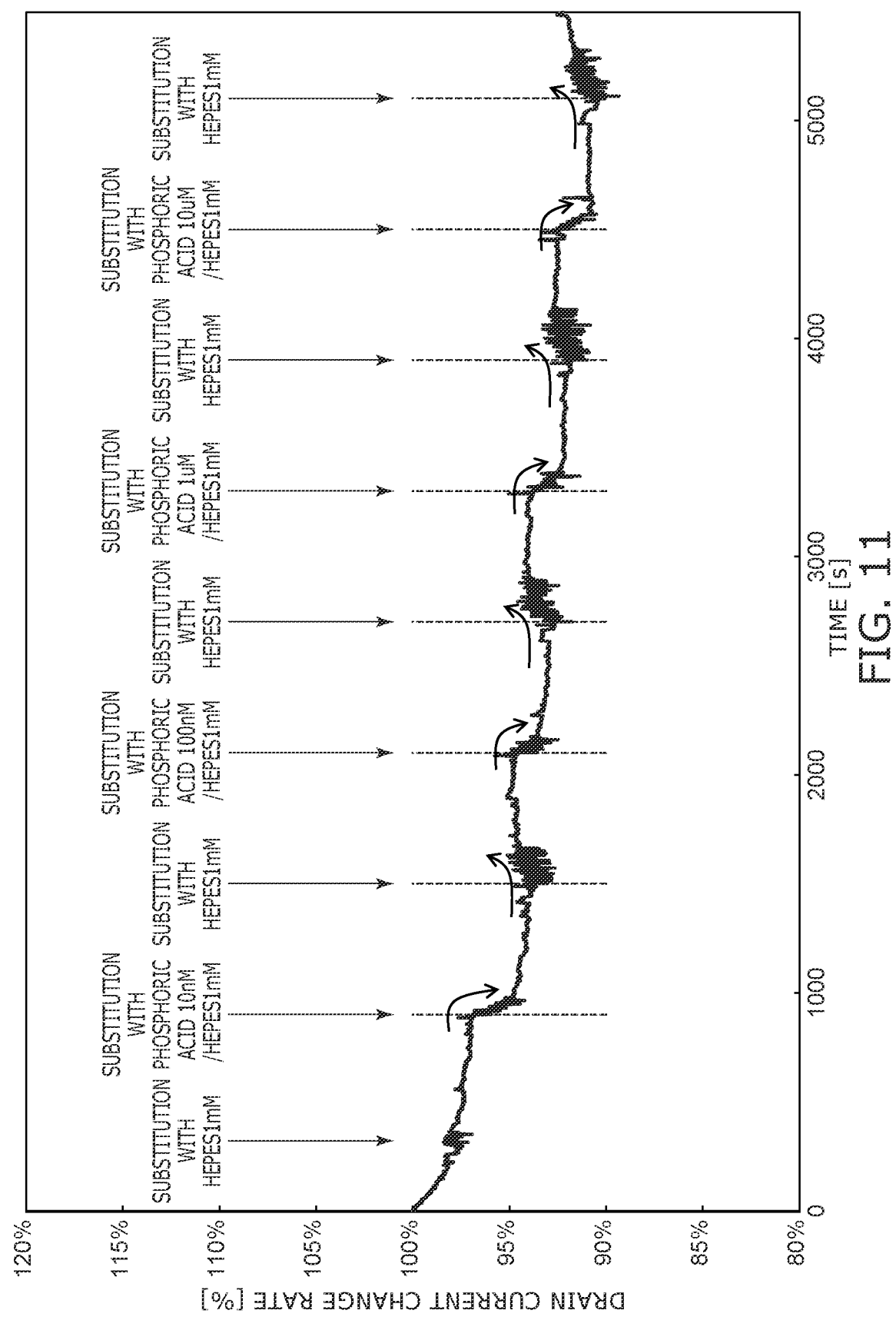
FIG. 11 is a graph showing a response of phosphoric acid in a HEPES buffer.

FIG. 11 is a graph showing the response of phosphoric acid ($H_3PO_4$) in a 1 mM HEPES buffer. To read the effect of phosphate, a HEPES buffer containing no phosphate ion was used.

From the results shown in FIG. 11, a strong response to phosphate ions was detected. From this, it was found that when the ion (sample substance) is detected in the phosphate buffer, the response of the ion (sample substance) may be slowed down due to the competition with the phosphate ion.

Figure 12:
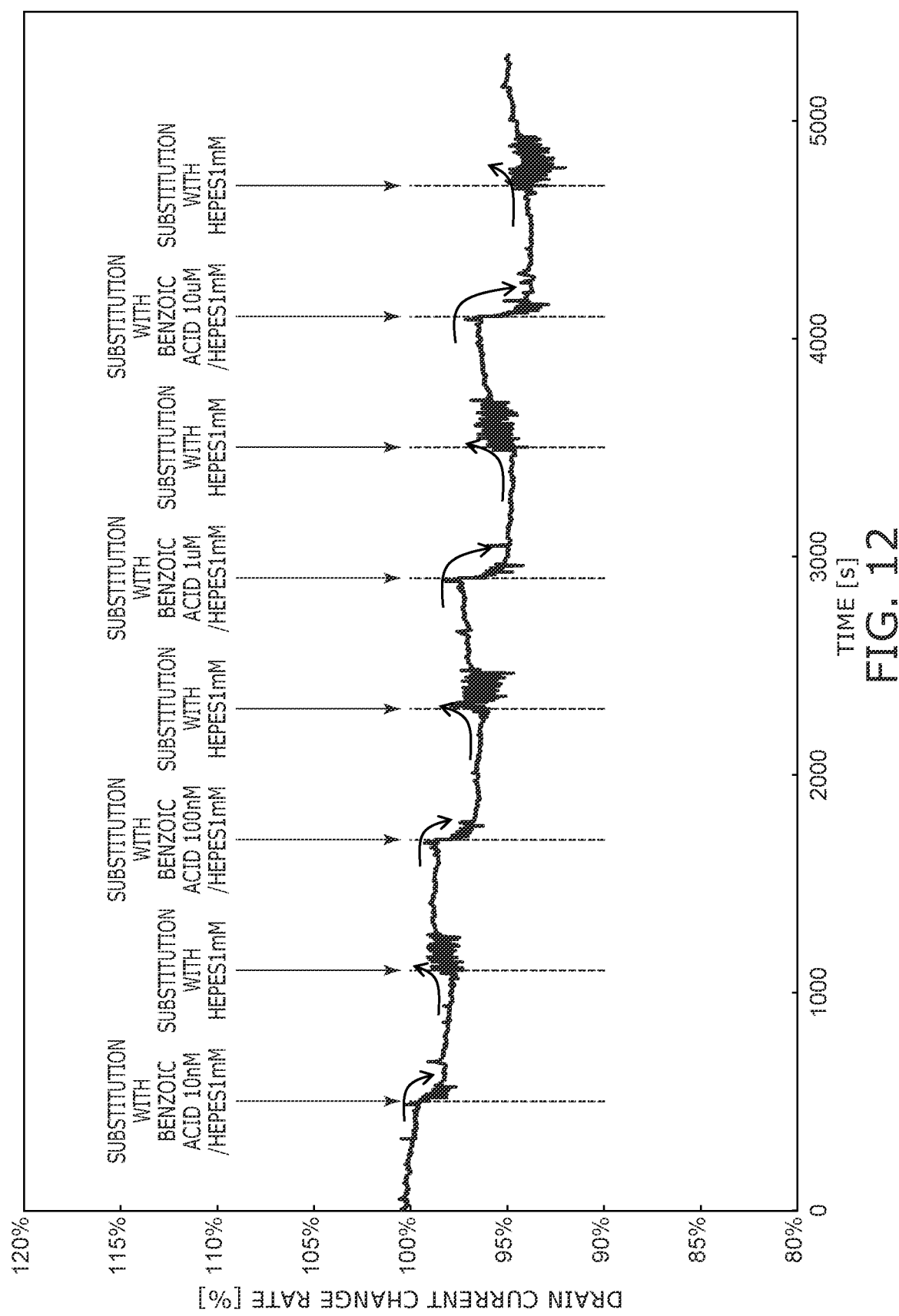
FIG. 12 is a graph showing a response of benzoic acid in the HEPES buffer.

FIG. 12 is a graph showing the response of benzoic acid in a 1 mM HEPES buffer.

From the results shown in FIG. 12, benzoic acid also shows a clear response in the HEPES buffer without phosphate ions.

FIGS. 13 to 17 are graphs showing the dependence on the phosphate concentration of the response of various ions in the phosphate buffer.

Figure 13:
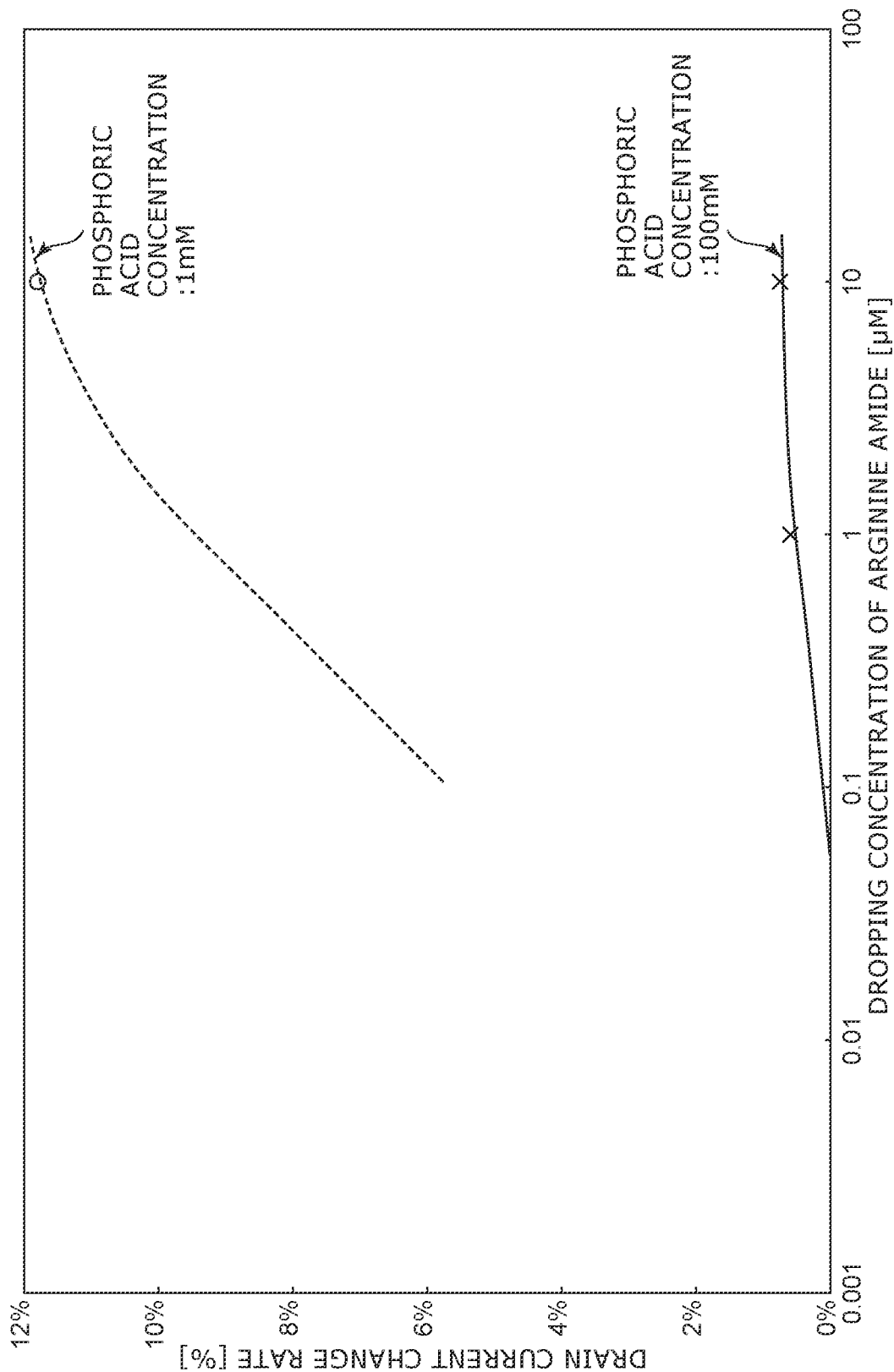
FIG. 13 is a graph showing a response of arginine amide to the phosphate buffer.

FIG. 13 is a graph showing the responses of arginine amide to 1 mM and 100 mM phosphate buffers. The horizontal axis is the concentration of arginine amide, and experiments were conducted at 1 uM and 10 uM.

Figure 14:
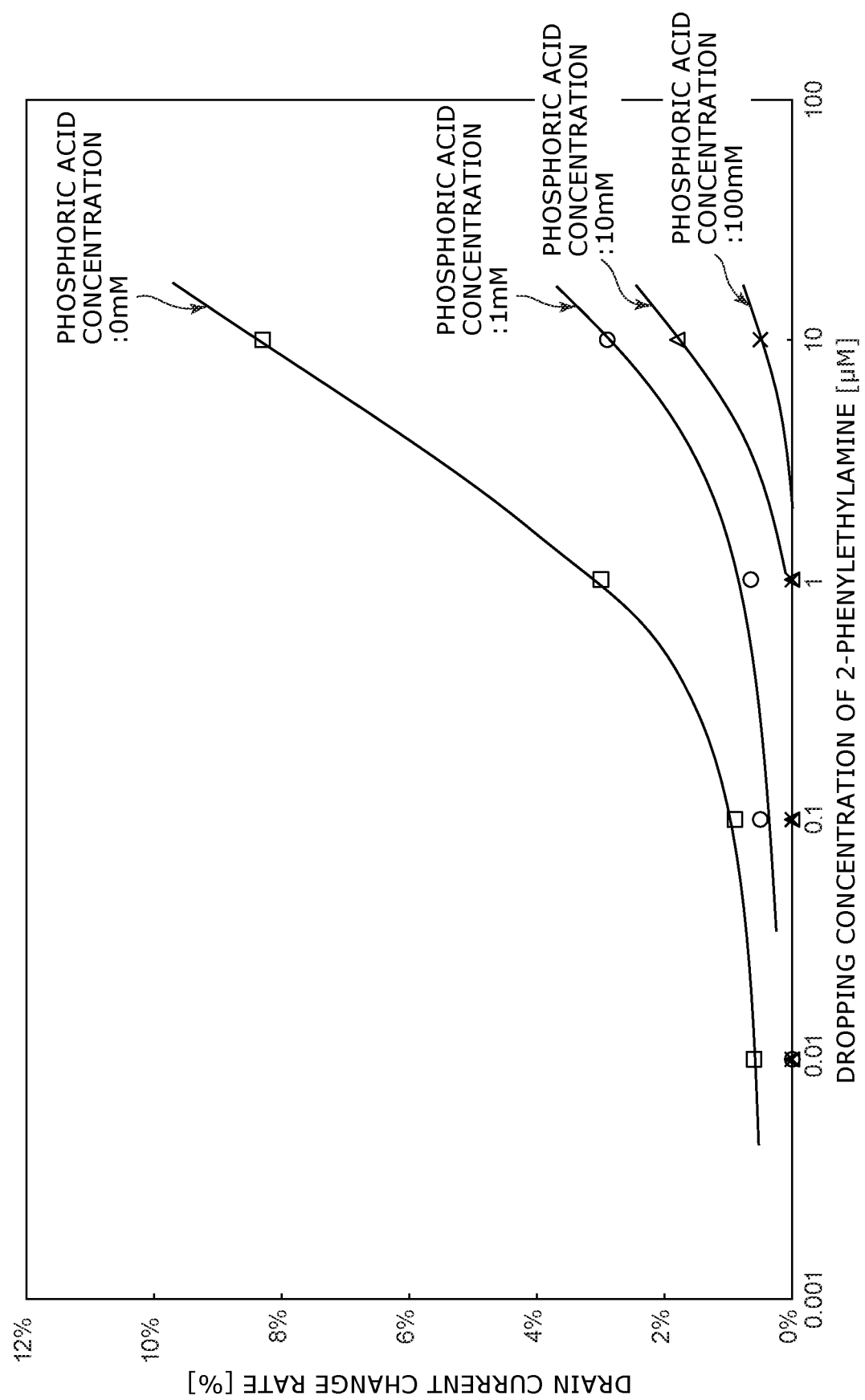
FIG. 14 is a graph showing a response of 2-phenylethylamine to the phosphate buffer.

FIG. 14 is a graph showing responses of 2-phenylethylamine to a 1 mM HEPES buffer (denoted as a phosphoric acid concentration of 0 mM in the drawing) and 1 mM, 10 mM, and 100 mM phosphate buffers. The horizontal axis is the concentration of 2-phenylethylamine, and experiments were conducted in the range of 10 nM to 10 uM.

Figure 15:
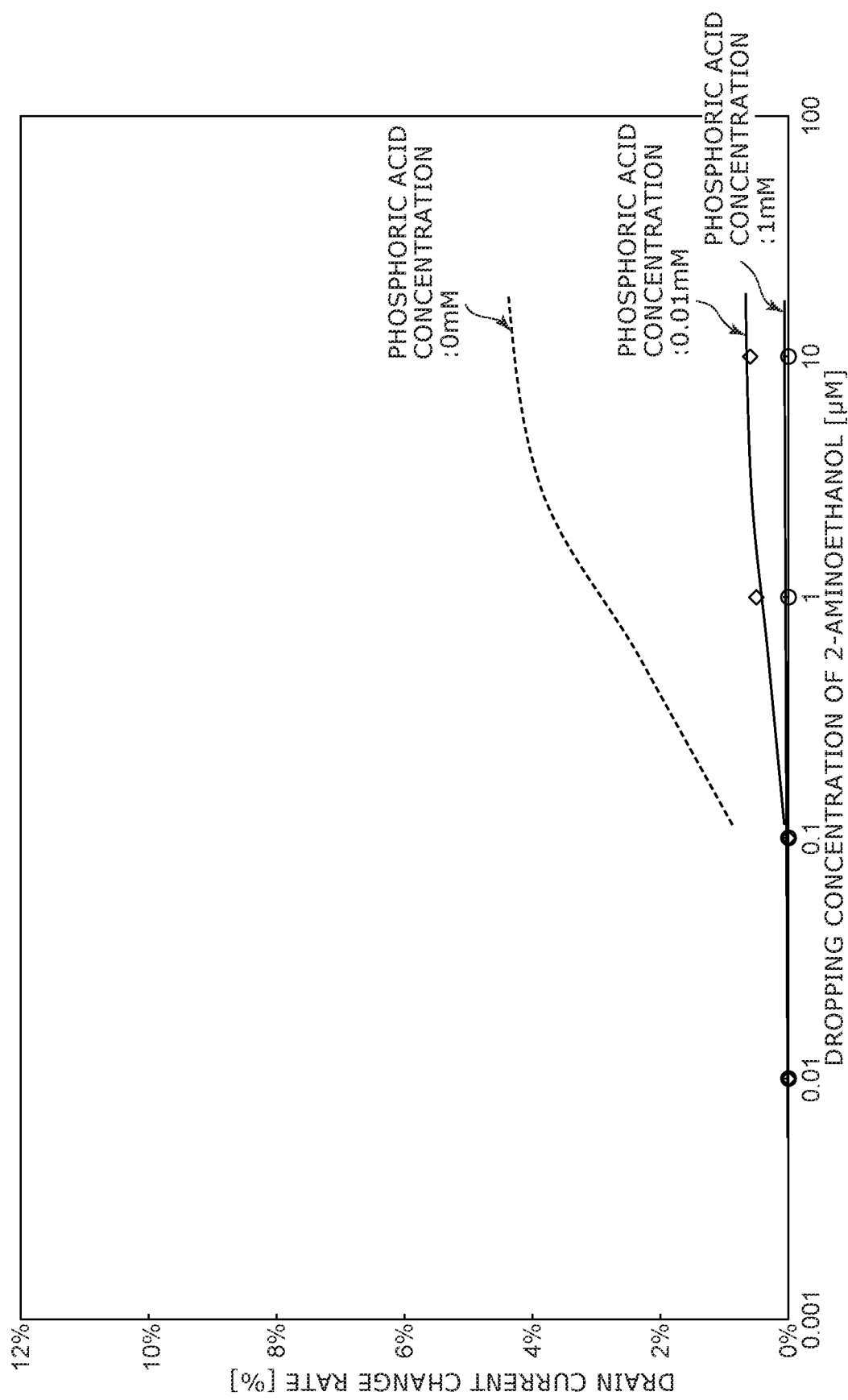
FIG. 15 is a graph showing a response of 2-aminoethanol to the phosphate buffer.

FIG. 15 is a graph showing responses of 2-aminoethanol to a 1 mM HEPES buffer (denoted as a phosphoric acid concentration of 0 mM in the drawing), a 1 mM HEPES buffer to which 10 uM phosphoric acid was added (denoted as a phosphoric acid concentration of 0.01 mM in the drawing), and a 1 mM phosphate buffer. The horizontal axis is the concentration of 2-aminoethanol, and experiments were conducted in the range of 10 nM to 10 uM.

Figure 16:
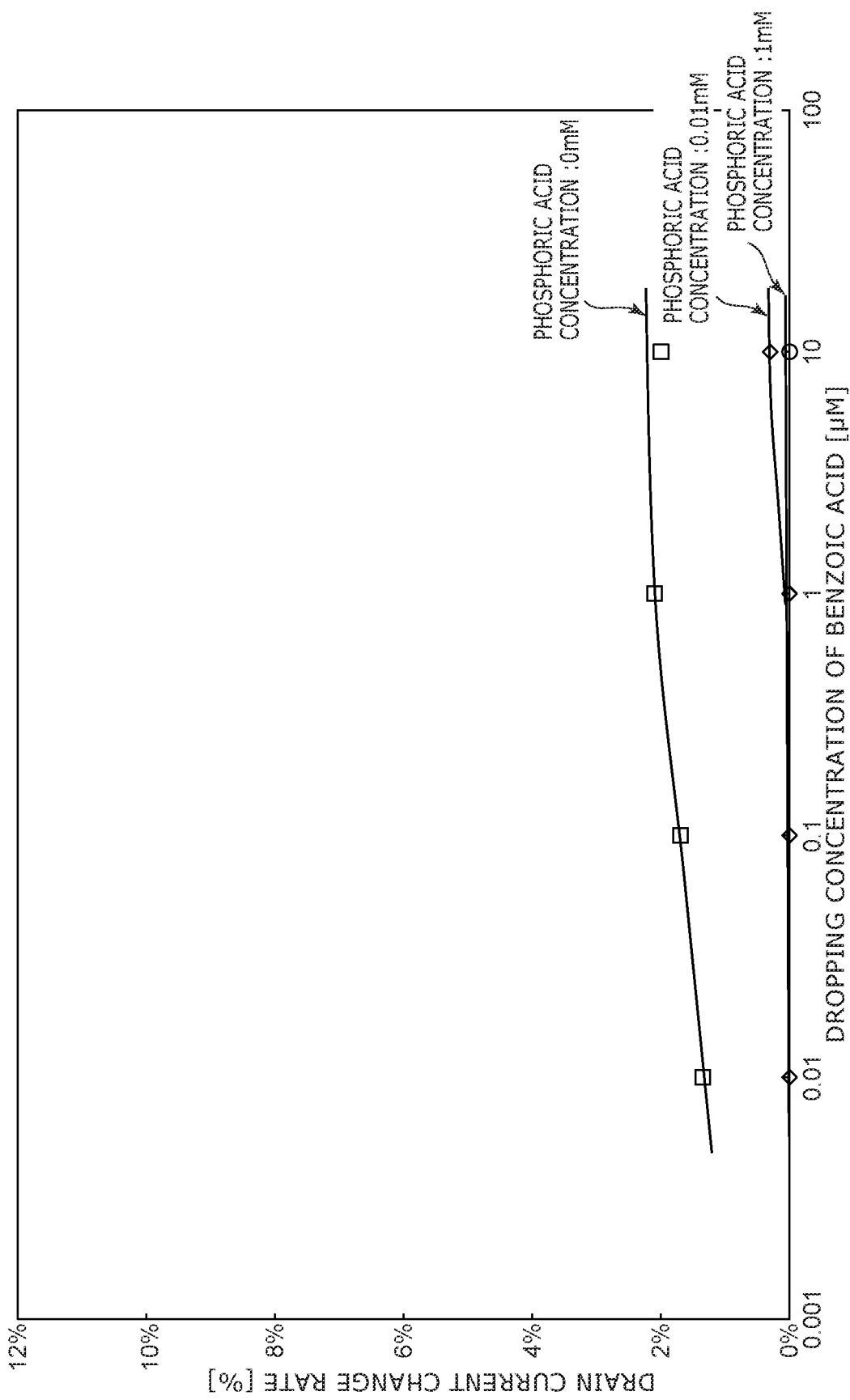
FIG. 16 is a graph showing response of benzoic acid to the phosphate buffer.

FIG. 16 is a graph showing responses of benzoic acid to a 1 mM HEPES buffer (denoted as a phosphoric acid concentration of 0 mM in the drawing), a 1 mM HEPES buffer to which 10 uM phosphoric acid was added (denoted as a phosphoric acid concentration of 0.01 mM in the drawing), and a 1 mM phosphate buffer. The horizontal axis is the concentration of benzoic acid, and experiments were conducted in the range of 10 nM to 10 uM.

Figure 17:
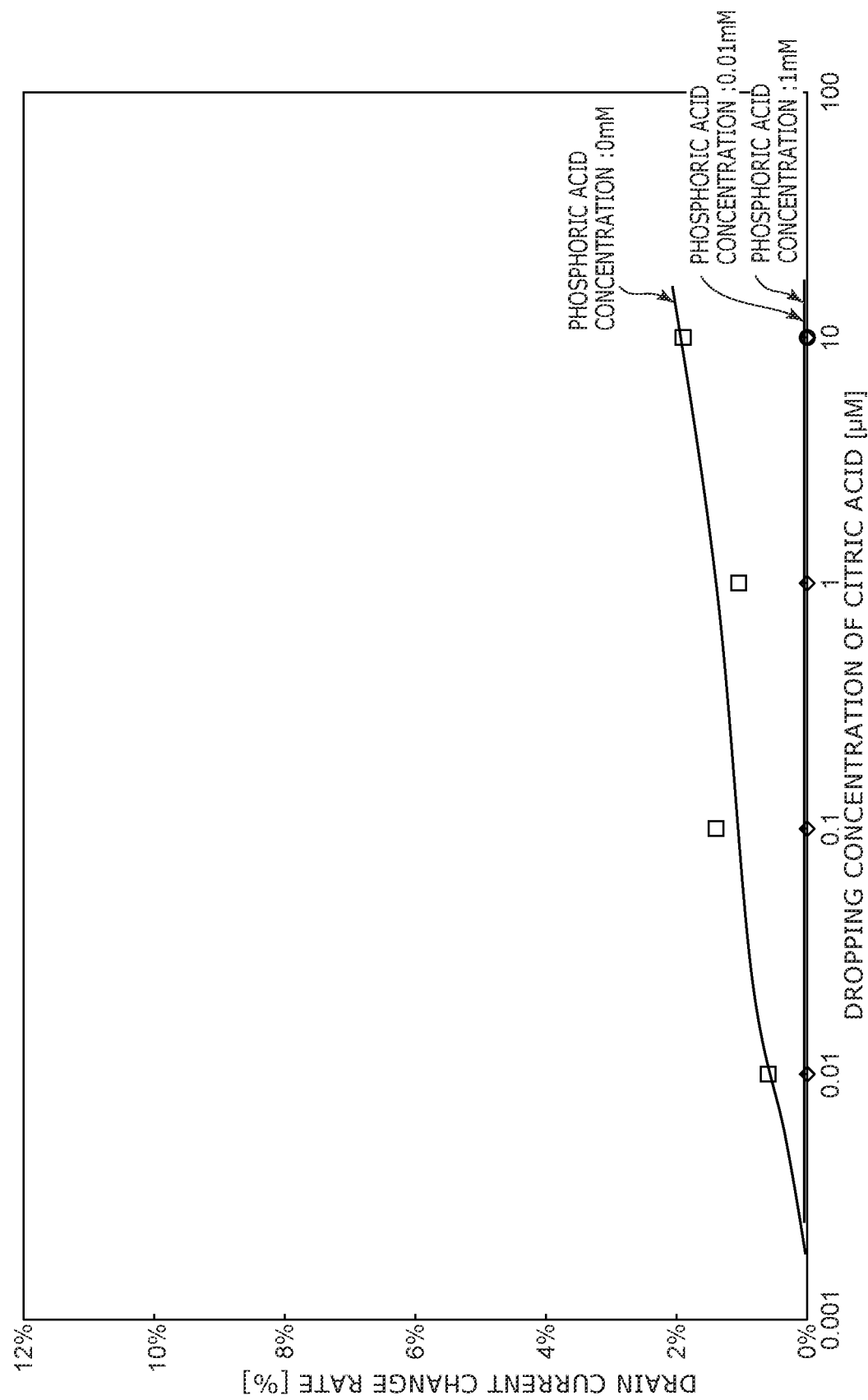
FIG. 17 is a graph showing a response of citric acid to the phosphate buffer.

FIG. 17 is a graph showing responses of citric acid to a 1 mM HEPES buffer (denoted as a phosphoric acid concentration of 0 mM in the drawing), a 1 mM HEPES buffer to which 10 uM phosphoric acid is added (denoted as a phosphoric acid concentration of 0.01 mM in the drawing), and a 1 mM phosphate buffer. The horizontal axis is the concentration of citric acid, and experiments were conducted in the range of 10 nM to 10 uM.

FIG. 18 is a table summarizing the above experimental results.

From the results of FIG. 18, in the HEPES buffer containing no phosphate ion, both cations and anions were detected regardless of the presence or absence of conjugated double bonds. Although results are not shown, it has been found that uncharged hydrophilic compounds, for example, zwitterions such as amino acids with an isoelectric point near neutrality, are difficult to detect with graphene FET. The result suggests that the presence or absence of charge of the hydrophilic compound can be discriminated by using a solvent containing no phosphate ion.

Further, in the HEPES buffer to which a 10 uM phosphate ion was added, citric acid, which is an anion having no conjugated double bond, was not detected, and benzoic acid, which is an anion having a conjugated double bond, and 2-aminoethanol, which is a cation having no conjugated double bonds were both detected. In addition, 2-phenylethylamine and arginine amide, which are cations having a conjugated double bond, can be detected as a strong signal with a drain current change rate of more than 1% even in a phosphate buffer having a higher phosphate ion concentration. From this, it can be presumed that 2-phenylethylamine and arginine amide can be detected even with a phosphate ion concentration of 10 uM.

Further, in the 1 mM phosphate buffer having a phosphate ion concentration of 1 mM, neither benzoic acid nor 2-aminoethanol was detected, but only 2-phenylethylamine and arginine amide, which are cations having a conjugated double bond, were detected. Furthermore, when a phosphate buffer having a phosphate ion concentration of 1 mM or more is used, the drain current change rate of arginine amide, which has a valence of 2, is higher than that of 2-phenylethylamine, which has a valence of 1, among cations having a conjugated double bond. Therefore, it is possible to identify the positive and negative charges (cation and anion), the presence or absence of a conjugated double bond, and the valence of the sample substance.

According to the embodiment, the same sample substance is mixed in equal amounts with the first to n-th aqueous solutions having different phosphate ion concentrations (for example, phosphate buffer or HEPES buffer), and the first to n-th graphene sensors 30-1 to 30-$n$ are exposed to the first to n-th aqueous solutions. The sample substance can be identified from the difference in the electrical characteristics of the graphene sensors 30-1 to 30-$n$ due to the difference in the first to n-th aqueous solutions (difference in the phosphate ion concentration).

The invention is not limited to using multiple graphene sensors, and one graphene sensor may be used to expose to the first to n-th aqueous solutions n times and to measure the electrical characteristics n times.

When magnesium sulfate was added to the HEPES buffer, a strong masking effect on 2-phenylethylamine was observed, which was equal to or higher than that when the phosphate buffer was used.

Figure 19:
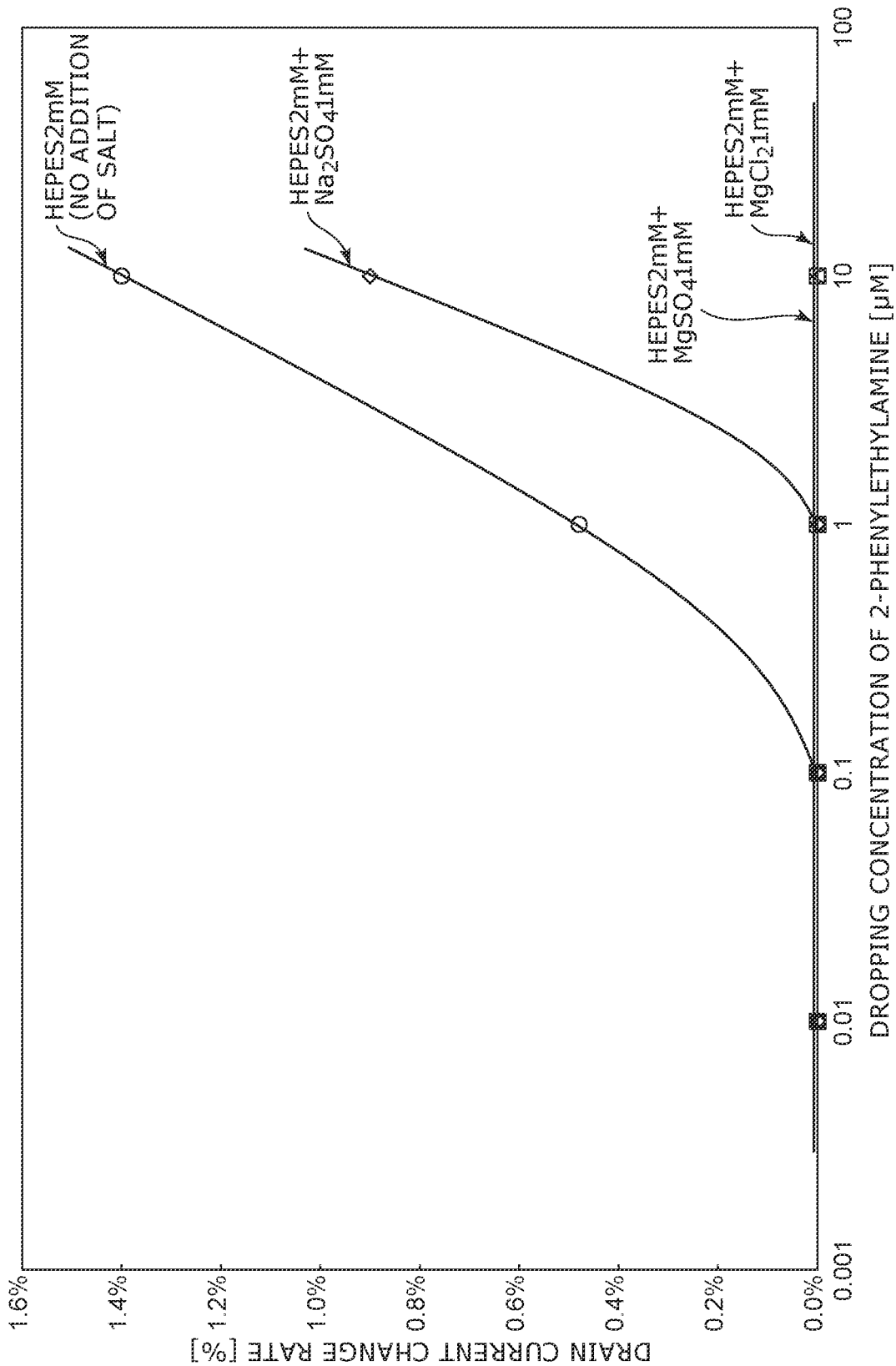
FIG. 19 is a graph showing a response of 2-phenylethylamine in the HEPES buffer.

FIG. 19 is a graph showing the response of 2-phenylethylamine in the HEPES buffer. The horizontal axis represents the dropping concentration of 2-phenylethylamine. The vertical axis represents the drain current change rate (ratio of the drain current value after the change over time to the initial drain current value).

In order to investigate whether either magnesium ion or sulfate ion was masking, magnesium sulfate, magnesium chloride, and sodium sulfate were added to 2 mM HEPES buffer, respectively, and experiments were conducted.

From the results shown in FIG. 19, a remarkable masking effect on 2-phenylethylamine can be obtained when the HEPES buffer contains magnesium ions. It was also confirmed that sulfate ion also showed a slight masking effect. Both magnesium ion and sulfate ion are divalent ions, and it is presumed that high ionic strength affects the masking effect.

Therefore, the same sample substance is mixed in equal amounts with the first to n-th aqueous solutions (for example, HEPES buffer) having different concentrations of magnesium ion or sulfate ion, and the first to n-th graphene sensors 30-1 to 30-$n$ are exposed to the first to n-th aqueous solutions. The sample substance can be identified from the difference in electrical characteristics of the graphene sensors 30-1 to 30-$n$ due to the difference in the first to n-th aqueous solutions (difference in the concentration of magnesium ion or sulfate ion).

In addition, the aqueous solution may contain either an anion or a cation having a conjugated double bond, in addition to a polyvalent ion such as a phosphate ion, a magnesium ion, or a sulfate ion. Ions with a conjugated double bond have a Π-Π interaction with graphene, and thus, a masking effect on the sample substance can be expected.

Figure 20:
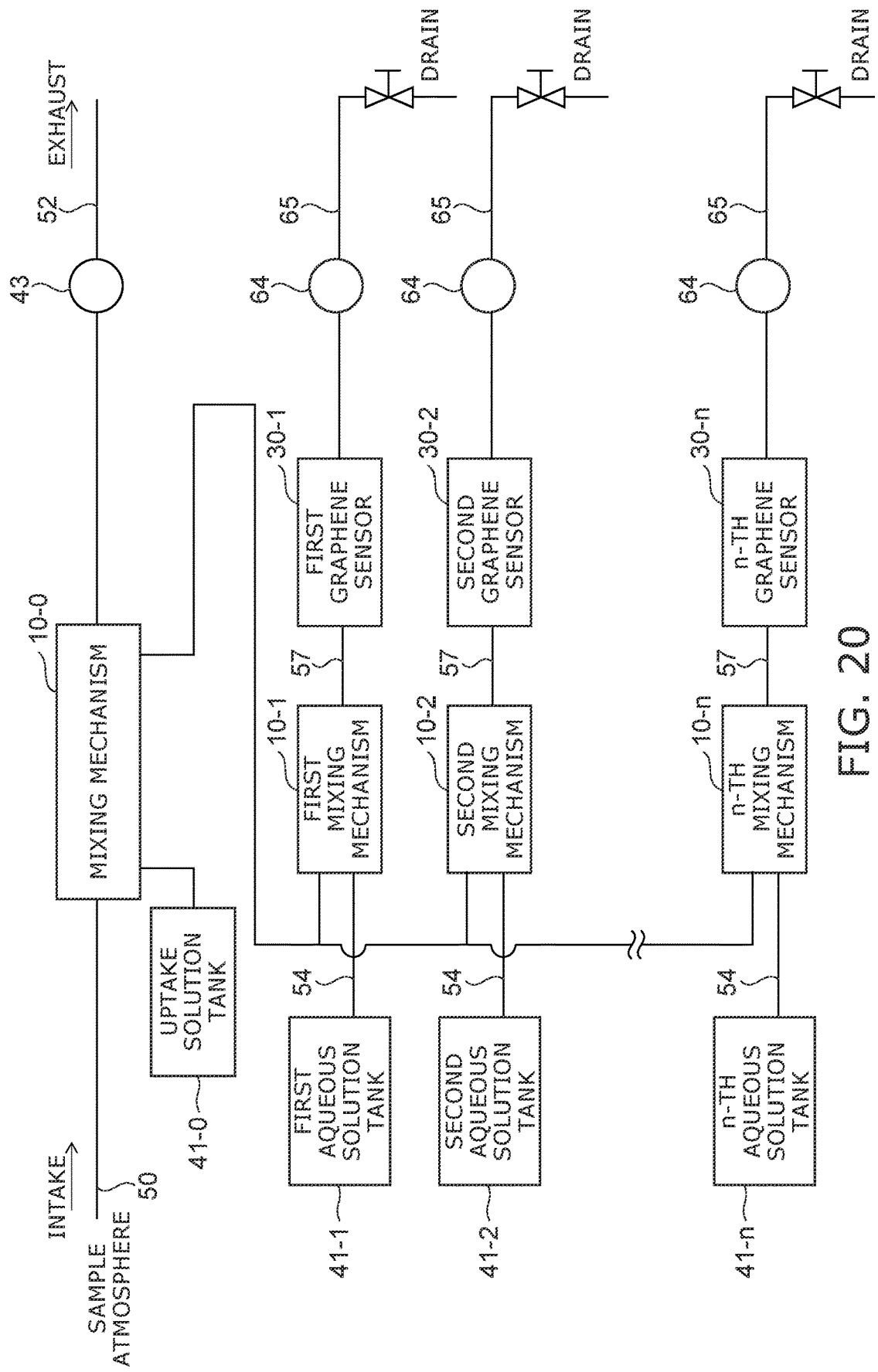
FIG. 20 is a schematic configuration diagram of a chemical sensor module of a variation 1.

Variation 1 of the chemical sensor module will be described with reference to FIG. 20. FIG. 20 is a schematic configuration diagram of the chemical sensor module of Variation 1.

The mixing mechanism 10-0 mixes an uptake solution supplied from an uptake solution tank 41-0 and the sample atmosphere taken in from the intake pipe 50, and supplies the mixed solution to the first to n-th mixing mechanisms 10-1 to 10-$n$. For example, the uptake solution is a buffer solution or pure water that does not contain phosphate ions, magnesium ions, and sulfate ions.

The first to n-th aqueous solution tanks 41-1 to 41-$n$ supply buffer solutions having different concentrations of any of phosphate ion, magnesium ion, or sulfate ion to the first to n-th mixing mechanisms 10-1 to 10-$n$, respectively. The first to n-th mixing mechanisms 10-1 to 10-$n$ mix the uptake solution in which the sample atmosphere has been incorporated and a buffer supplied from the first to n-th aqueous solution tanks 41-1 to 41-$n$, respectively, and this mixed solution is supplied to the first to n-th graphene sensors 30-1 to 30-$n$. The solvent of the buffer may be a water-soluble organic solvent.

The solutions exposed to the first to n-th graphene sensors 30-1 to 30-$n$ have different concentrations of phosphate ion, magnesium ion, or sulfate ion. Also in Variation 1, the sample substance can be identified from the difference in the electrical characteristics of the first to n-th graphene sensors 30-1 to 30-$n$.

Figure 21:
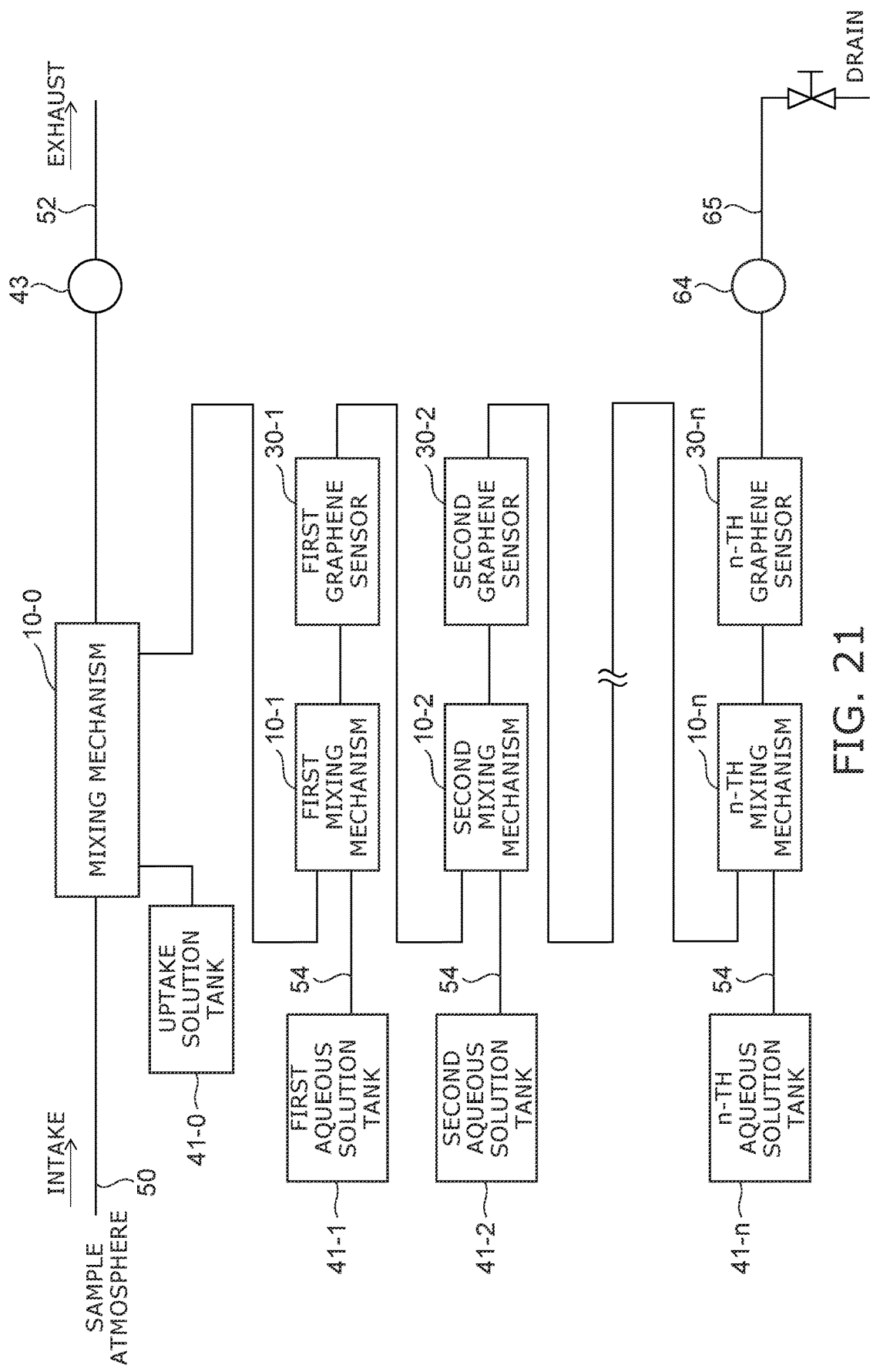
FIG. 21 is a schematic configuration diagram of a chemical sensor module of a variation 2.

Variation 2 of the chemical sensor module will be described with reference to FIG. 21. FIG. 21 is a schematic configuration diagram of the chemical sensor module of Variation 2.

In Variation 2, the mixing mechanism 10-0 supplies the uptake solution in which the sample atmosphere has been incorporated only to the first mixing mechanism 10-1. The m-th graphene sensor 10-$m$ (m is a natural number of 1 or greater and n−1 or less) supplies the measured solution to the (m+1)-th mixing mechanism 10-(m+1). The n-th graphene sensor 30-$n$ discharges the measured solution to the drainage pipe 65.

In the chemical sensor module of Variation 2, after the sample atmosphere is incorporated into the uptake solution by the mixing mechanism 10-0, measurement by the first graphene sensor 30-1 when the first aqueous solution is added by the first mixing mechanism 10-1, re-measurement by the second graphene sensor 30-2 when additional addition of the second aqueous solution by the second mixing mechanism 10-2, and subsequently, the third and fourth ion addition and sensor measurement are repeated continuously. The concentrations of phosphate ion, magnesium ion, or sulfate ion contained in the aqueous solutions in the first to n-th aqueous solution tanks 41-1 to 41-$n$ may be the same or different.

The solutions exposed to the first to n-th graphene sensors 30-1 to 30-$n$ have different concentrations of phosphate ion, magnesium ion, or sulfate ion. Also in Variation 2, the sample substance can be identified from the difference in the electrical characteristics of the first to n-th graphene sensors 30-1 to 30-$n$.

Although the embodiment in which the target substance ion (sample substance) in the gas phase is incorporated into the liquid phase and detected has been described above, the collection of the sample substance is not limited to the gas phase. For example, it may be a sample substance that adheres to or permeates the solid surface or the inside thereof, or it may be a sample substance that dissolves in a liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:
1. A chemical sensor module comprising:
a plurality of pipes carrying different types of aqueous solutions containing a sample substance and having different concentrations of phosphate ion, magnesium ion, or sulfate ion; and
a plurality of graphene sensors each installed in each of the plurality of pipes, each of the plurality of graphene sensors including a graphene film exposed to each of the different types of aqueous solutions in each of the plurality of pipes, a first electrode connected to the graphene film, and a second electrode connected to the graphene film, the plurality of graphene sensors identifying the sample substance from a difference in electrical characteristics detected by the first and second electrodes of each of the plurality of graphene sensors.

2. The module according to claim 1, configured for identifying at least one of a charge of the sample substance, a valence of the sample substance, and a presence or absence of a conjugated double bond of the sample substance.

3. The module according to claim 1, wherein
the different types of aqueous solutions contain any one of a HEPES buffer, a phosphate buffer, and a mixture thereof.

4. The module according to claim 1, wherein
the different types of aqueous solutions contain any one of a polyvalent anion, a polyvalent cation, an anion having a conjugated double bond, and a cation having a conjugated double bond.

5. The module according to claim 1, wherein
each of the plurality of graphene sensors includes a gate wiring in contact with each of the different types of aqueous solutions.

6. The module according to claim 1, wherein
the plurality of pipes are connected in parallel to an intake port of the sample substance.

\* \* \* \* \*